US010774801B2

(12) United States Patent
Kinoshita

(10) Patent No.: US 10,774,801 B2
(45) Date of Patent: Sep. 15, 2020

(54) VEHICLE POWER SUPPLY APPARATUS

(71) Applicant: SUBARU CORPORATION, Tokyo (JP)

(72) Inventor: Takahiro Kinoshita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 204 days.

(21) Appl. No.: 15/948,811

(22) Filed: Apr. 9, 2018

(65) Prior Publication Data

US 2018/0291857 A1 Oct. 11, 2018

(30) Foreign Application Priority Data

Apr. 10, 2017 (JP) ................................. 2017-077291

(51) Int. Cl.
*F02N 11/08* (2006.01)
*H02J 7/14* (2006.01)
(Continued)

(52) U.S. Cl.
CPC .......... *F02N 11/087* (2013.01); *B60R 16/033* (2013.01); *F02N 11/0866* (2013.01);
(Continued)

(58) Field of Classification Search
None
See application file for complete search history.

(56) References Cited

U.S. PATENT DOCUMENTS

2015/0134166 A1* 5/2015 Aoki ...................... B60K 6/445
701/22
2015/0355288 A1* 12/2015 Yokoyama ........ H01M 10/4285
702/63
(Continued)

FOREIGN PATENT DOCUMENTS

JP 2013-256174 A 12/2013
JP 2013-256267 A 12/2013
(Continued)

OTHER PUBLICATIONS

Japanese Office Action, dated Feb. 26, 2019, in Japanese Application No. 2017-077291 and English Translation thereof.

*Primary Examiner* — Jared Fureman
*Assistant Examiner* — Joel Barnett
(74) *Attorney, Agent, or Firm* — McGinn I.P. Law Group, PLLC.

(57) ABSTRACT

A vehicle power supply apparatus includes a motor generator, a first electricity storage, a second electricity storage, a first switch, a second switch, a switch controller, and an electricity storage determiner. The first and second electricity storages are able to be coupled to the motor generator that is coupled to an engine. The first switch and the second switch each switch from electric conduction between the motor generator and corresponding one of the first and second electricity storages to cutoff between the motor generator and corresponding one of the first and second electricity storages and vice versa. The switch controller controls the first switch and the second switch. The electricity storage determiner determines an abnormality of the first electricity storage. The switch controller controls each of the first switch and the second switch into an electrically-conductive state when the first electricity storage is determined as being in an abnormal state.

20 Claims, 12 Drawing Sheets

(51) Int. Cl.
  *B60R 16/033* (2006.01)
  *F02N 11/04* (2006.01)
  *B60W 20/00* (2016.01)
  *H02J 7/24* (2006.01)

(52) U.S. Cl.
  CPC .......... *H02J 7/1423* (2013.01); *H02J 7/1461* (2013.01); *B60W 20/00* (2013.01); *F02N 11/04* (2013.01); *H02J 7/1492* (2013.01); *H02J 7/24* (2013.01); *Y02T 10/7016* (2013.01); *Y10S 903/904* (2013.01)

(56) References Cited

U.S. PATENT DOCUMENTS

2016/0257270 A1* 9/2016 Teramoto ................ B60L 58/20
2016/0303985 A1* 10/2016 Ueki ..................... H02J 7/1446
2019/0131804 A1* 5/2019 Taniguchi ................ H02J 1/00

FOREIGN PATENT DOCUMENTS

| JP | 2016-132324 A | 7/2016 |
| JP | 2016-164015 A | 9/2016 |

* cited by examiner

VEHICLE POWER SUPPLY APPARATUS

CROSS-REFERENCE TO RELATED APPLICATIONS

The present application claims priority from Japanese Patent Application No. 2017-077291 filed on Apr. 10, 2017, the entire contents of which are hereby incorporated by reference.

BACKGROUND

The technology relates to a vehicle power supply apparatus to be mounted on a vehicle.

Various proposals have been made on a vehicle power supply apparatus to be mounted on a vehicle. For example, Japanese Unexamined Patent Application Publication (JP-A) No. 2013-256267 proposes a power supply apparatus that includes a plurality of batteries.

SUMMARY

An aspect of the technology provides a vehicle power supply apparatus that includes: a motor generator coupled to an engine; a first electricity storage able to be coupled to the motor generator; a second electricity storage able to be coupled to the motor generator in parallel to the first electricity storage; a first switch configured to switch from electric conduction between the motor generator and the first electricity storage to cutoff between the motor generator and the first electricity storage and vice versa; a second switch configured to switch from electric conduction between the motor generator and the second electricity storage to cutoff between the motor generator and the second electricity storage and vice versa; a switch controller configured to control the first switch and the second switch; and an electricity storage determiner configured to determine an abnormality of the first electricity storage. The switch controller is configured to control each of the first switch and the second switch into an electrically-conductive state when the first electricity storage is determined by the electricity storage determiner as being in an abnormal state.

An aspect of the technology provides a vehicle power supply apparatus that includes: a motor generator coupled to an engine; a first electricity storage able to be coupled to the motor generator; a second electricity storage able to be coupled to the motor generator in parallel to the first electricity storage; a first switch configured to switch from electric conduction between the motor generator and the first electricity storage to cutoff between the motor generator and the first electricity storage and vice versa; a second switch configured to switch from electric conduction between the motor generator and the second electricity storage to cutoff between the motor generator and the second electricity storage and vice versa; and circuitry configured to control the first switch and the second switch, determine an abnormality of the first electricity storage, and control each of the first switch and the second switch into an electrically-conductive state when the first electricity storage is determined as being in an abnormal state.

DETAILED DESCRIPTION

Figure 1:
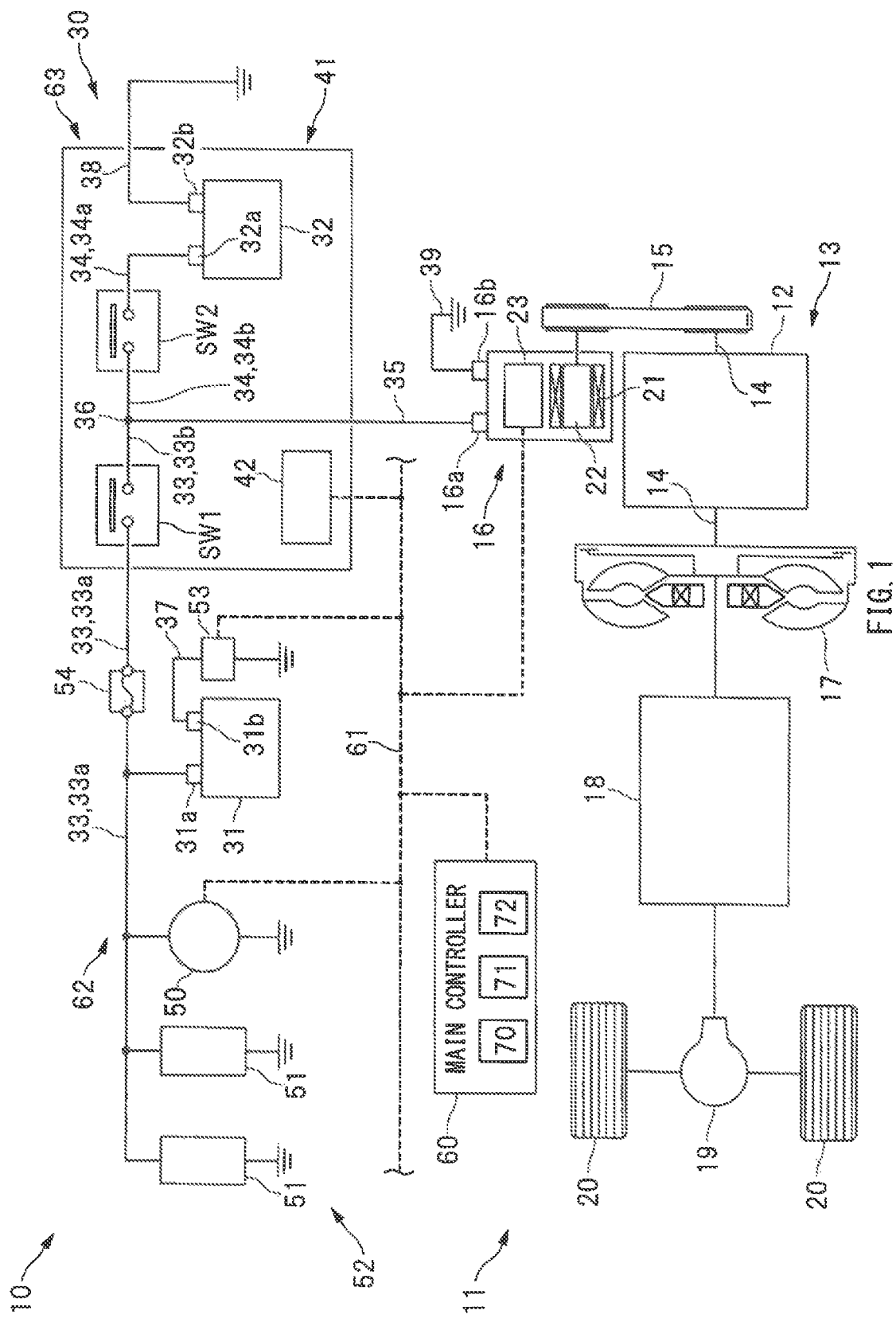
FIG. 1 is a diagram schematically illustrating an example of a configuration of a vehicle provided with a vehicle power supply apparatus according to one implementation of the technology.

In the following, some implementations of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

When a plurality of electrical loads operate by means of a plurality of batteries, it is desirable that each of such electrical loads operate normally even under circumstances where an abnormality occurs in any of the batteries. One reason is that a situation involving difficulties in operating any of the electrical loads normally leads to a decrease in reliability of a vehicle power supply apparatus.

It is desirable to provide a vehicle power supply apparatus having high reliability.

FIG. 1 is a schematic diagram illustrating an example of a configuration of a vehicle 11 provided with a vehicle power supply apparatus 10 according to an example implementation of the technology. Referring to FIG. 1, the vehicle 11 may be mounted with a power unit 13. The power unit 13 may include an engine 12 that serves as a power source. The engine 12 may include a crankshaft 14 that is mechanically coupled to a starter generator 16 via a belt mechanism 15. In one implementation, the starter generator 16 may serve as a "motor generator". The engine 12 may also be coupled to a transmission mechanism 18 via a torque converter 17. The transmission mechanism 18 may be coupled to wheels 20 via a member such as a differential mechanism 19.

The starter generator 16 coupled to the engine 12 may be a so-called integrated starter generator (ISG) that serves both as an electric generator and an electric motor. The starter generator 16 may serve not only as the electric generator to be driven by the crankshaft 14 but may also serve as the electric motor that revolves the crankshaft 14. For example, the starter generator 16 may be controlled into a powering state as the electric motor when restarting the engine 12 upon an idling stop control, or when assisting the engine 12 upon start and acceleration. The starter generator 16 may include a stator 21 having a stator coil and a rotor 22 having a field coil.

The starter generator 16 may further include an ISG controller 23 in order to control a conducting state of each of the stator coil and the field coil. The ISG controller 23 may include components such as an inverter, a regulator, and a microcomputer. The ISG controller 23 may control the conducting state of each of the field coil and the stator coil, thus controlling an electric power generation voltage, motor torque, and/or any other factor, of the starter generator 16. In one implementation, the ISG controller 23 together with a later-described main controller 60 may serve as a "motor controller".

[Power Supply Circuit]

Figure 2:
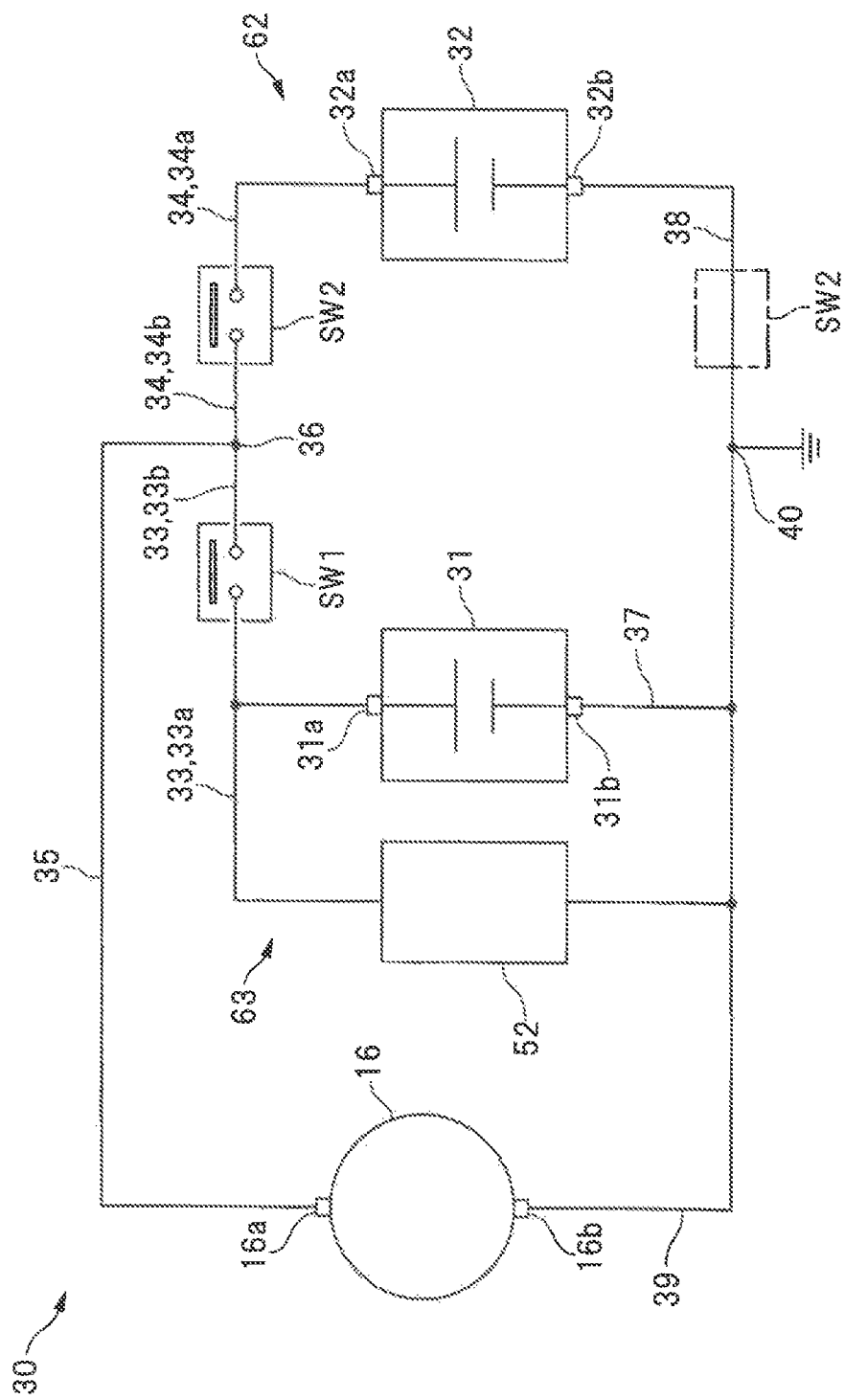
FIG. 2 is a circuit diagram illustrating an example of a power supply circuit.

A description is given of a power supply circuit 30 included in the vehicle power supply apparatus 10. FIG. 2 is a circuit diagram illustrating an example of the power supply circuit 30. Referring to FIG. 2, the power supply circuit 30 may include a lead battery 31 and a lithium-ion battery 32. In one implementation, the lead battery 31 may serve as a "first electricity storage". In one implementation, the lithium-ion battery 32 may serve as a "second electricity storage". The lead battery 31 may be configured to be electrically coupled to the starter generator 16. The lithium-ion battery 32 may be configured to be electrically coupled to the starter generator 16 in parallel to the lead battery 31. The lithium-ion battery 32 may have a terminal voltage that is designed higher than a terminal voltage of the lead battery 31 in order to actively discharge the lithium-ion battery 32. Further, the lithium-ion battery 32 may have internal resistance that is designed smaller than internal resistance of the lead battery 31 in order to actively charge and discharge the lithium-ion battery 32.

The lead battery 31 may include a positive terminal 31a coupled to a positive line 33. The lithium-ion battery 32 may include a positive terminal 32a coupled to a positive line 34. The starter generator 16 may include a positive terminal 16a coupled to a positive line 35. These positive lines 33 to 35 may be coupled to one another via a node 36. The lead battery 31 may include a negative terminal 31b coupled to a negative line 37. The lithium-ion battery 32 may include a negative terminal 32b coupled to a negative line 38. The starter generator 16 may include a negative terminal 16b coupled to a negative line 39. These negative lines 37 to 39 each may be coupled to a reference potential point 40.

The positive line 33 of the lead battery 31 may be provided with a switch SW1 that is switchable between an electrically-conductive state and a cutoff state. In other words, the switch SW1 switches from electric conduction between the starter generator 16 and the lead battery 31 to cutoff between the starter generator 16 and the lead battery 31 and vice versa, i.e., switches from the cutoff between the starter generator 16 and the lead battery 31 to the electric conduction between the starter generator 16 and the lead battery 31. In one implementation, the switch SW1 may serve as a "first switch". For example, the positive line 33 of the lead battery 31 may include a conducting line 33a and a conducting line 33b. The conducting line 33a may extend from the switch SW1 to the positive terminal 31a of the lead battery 31. The conducting line 33b may extend from the switch SW1 to the node 36. Controlling the switch SW1 into the electrically-conductive state may allow the starter generator 16 and the lead battery 31 to be coupled to each other, whereas controlling the switch SW1 into the cutoff state may allow the starter generator 16 and the lead battery 31 to be isolated from each other.

The positive line 34 of the lithium-ion battery 32 may be provided with a switch SW2 that is switchable between an electrically-conductive state and a cutoff state. In other words, the switch SW2 switches from electric conduction between the starter generator 16 and the lithium-ion battery 32 to cutoff between the starter generator 16 and the lithium-ion battery 32 and vice versa, i.e., switches from the cutoff between the starter generator 16 and the lithium-ion battery 32 to the electric conduction between the starter generator 16 and the lithium-ion battery 32. In one implementation, the switch SW2 may serve as a "second switch". For example, the positive line 34 of the lithium-ion battery 32 may include a conducting line 34a and a conducting line 34b. The conducting line 34a may extend from the switch SW2 to the positive terminal 32a of the lithium-ion battery 32. The conducting line 34b may extend from the switch SW2 to the node 36. Controlling the switch SW2 into the electrically-conductive state may allow the starter generator 16 and the lithium-ion battery 32 to be coupled to each other, whereas controlling the switch SW2 into the cutoff state may allow the starter generator 16 and the lithium-ion battery 32 to be isolated from each other.

The switch SW1 and the switch SW2 each may be configured by a semiconductor element such as, but not limited to, a metal-oxide-semiconductor field-effect transistor (MOSFET). In an alternative implementation, the switch SW1 and the switch SW2 each may be a mechanical switch that opens and closes a contact by means of electromagnetic force, for example. Note that the switch SW1 and the switch SW2 each encompass a relay or a contact as well.

Referring to FIG. 1, the power supply circuit 30 may include a battery module 41. The lithium-ion battery 32 and the switches SW1 and SW2 may be incorporated into the battery module 41. The battery module 41 may further include a battery controller 42. The battery controller 42 may include a microcomputer, for example. The battery controller 42 may have a monitoring function and a control function. Non-limiting examples of the monitoring function may include monitoring of a state of charge SOC, charge and discharge currents, the terminal voltage, a cell temperature, and the internal resistance of the lithium-ion battery 32. Non-limiting examples of the control function may include controlling each of the switches SW1 and SW2. In one implementation, the battery controller 42 together with the later-described main controller 60 may serve as a "switch controller".

The positive line 33 of the lead battery 31 may be coupled to an electrical load group 52. Non-limiting examples of devices that configure the electrical load group 52 may include the starter generator 16 and other electrical loads 51. Further, although unillustrated in FIG. 1, the positive line 33 of the lead battery 31 may also be coupled to various controllers that serve as the electrical loads, including the ISG controller 23, the battery controller 42, and the later-described main controller 60. In other words, the various controllers including the ISG controller 23, the battery controller 42, and the main controller 60 each may be provided as one of the electrical loads that configure the electrical load group 52. Further, the negative line 37 of the lead battery 31 may be provided with a battery sensor 53. The battery sensor 53 may have a detection function. Non-limiting examples of the detection function may include detection of a state of charge SOC, charge and discharge currents, and the terminal voltage of the lead battery 31. The positive line 33 may also be provided with a fuse 54 that protects the electrical load group 52 and other devices.

[Control System]

A description is given of a control system of the vehicle power supply apparatus 10. The vehicle power supply apparatus 10 may be provided with the main controller 60 as illustrated in FIG. 1. The main controller 60 may include a microcomputer, for example. The main controller 60 and other controllers including the ISG controller 23 and the battery controller 42 may be so coupled to one another as to be able to perform a communication mutually and freely via an in-vehicle network 61. Non-limiting examples of the in-vehicle network 61 may include a controller area network (CAN) and a local interconnect network (LIN). The main controller 60 may control the ISG controller 23 and the battery controller 42 in an overall fashion, and may have a motor controller 70, a switch controller 71, and a battery determiner 72.

The motor controller 70 of the main controller 60 may set a target value of the electric power generation voltage, the motor torque, and/or any other factor, of the starter generator 16, and may output a control signal corresponding to the thus-set target value to the ISG controller 23. For example, the motor controller 70 of the main controller 60 may control the electric power generation voltage of the starter generator 16 on the basis of the state of charge SOC of the lithium-ion battery 32. In other words, as described later in greater detail, the motor controller 70 may control the charge and the discharge of the lithium-ion battery 32 by controlling the starter generator 16 into an electric power generation state or a power generation suspended state on the basis of the state of charge SOC of the lithium-ion battery 32. Note that the state of charge SOC refers to a ratio of an electricity storage amount of a battery to a designed capacity of the battery. The state of charge SOC may be transmitted from the battery controller 42 to the main controller 60.

The switch controller 71 of the main controller 60 may set an operation target value of each of the switches SW1 and SW2, and may output a control signal corresponding to the thus-set operation target value to the battery controller 42. For example, the switch controller 71 of the main controller 60 may control the switch SW1 into the cutoff state and control the switch SW2 into the electrically-conductive state upon restarting the engine 12 by means of the starter generator 16. In addition, for example, the switch controller 71 of the main controller 60 may control the switch SW1 into the electrically-conductive state and control the switch SW2 into the cutoff state upon performing auxiliary charging of the lead battery 31 by means of the starter generator 16.

The battery determiner 72 of the main controller 60 may have a function of determining whether the lead battery 31 is in a normal state in which the lead battery 31 is able to discharge normally. In one implementation, the battery determiner 72 may serve as an "electricity storage determiner". For example, the battery determiner 72 of the main controller 60 may determine that the lead battery 31 is in the normal state, when a voltage, a current, and/or any other factor of the lead battery 31 falls within a predetermined normal range. In addition, for example, the battery determiner 72 of the main controller 60 may determine that the lead battery 31 is in an abnormal state in which the lead battery 31 is not able to discharge normally, when the voltage, the current, and/or any other factor of the lead battery 31 falls outside the predetermined normal range.

[Battery Charge-Discharge Control]

Figure 3:
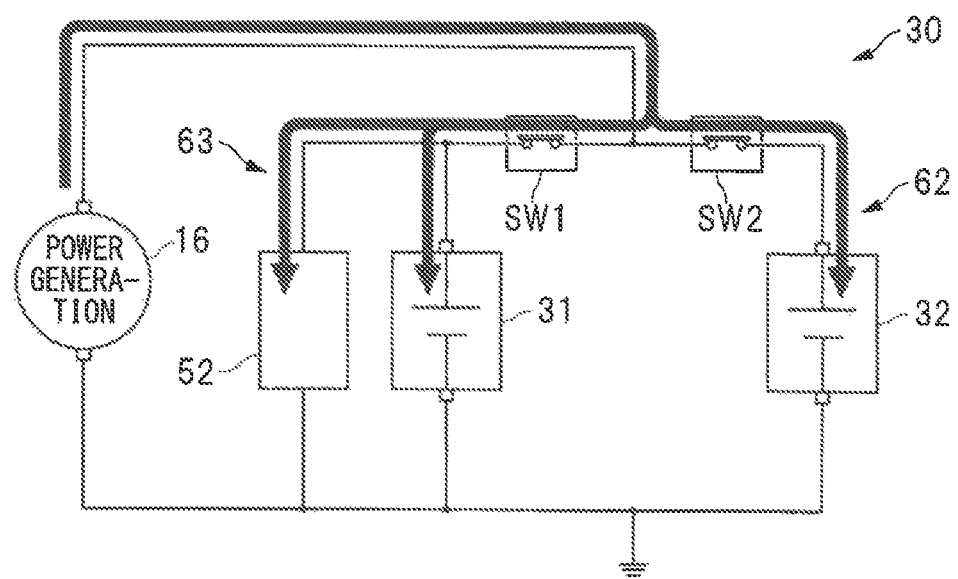
FIG. 3 is a circuit diagram illustrating an example of an electric power supply situation when a starter generator is controlled into an electric power generation state.
Figure 4:
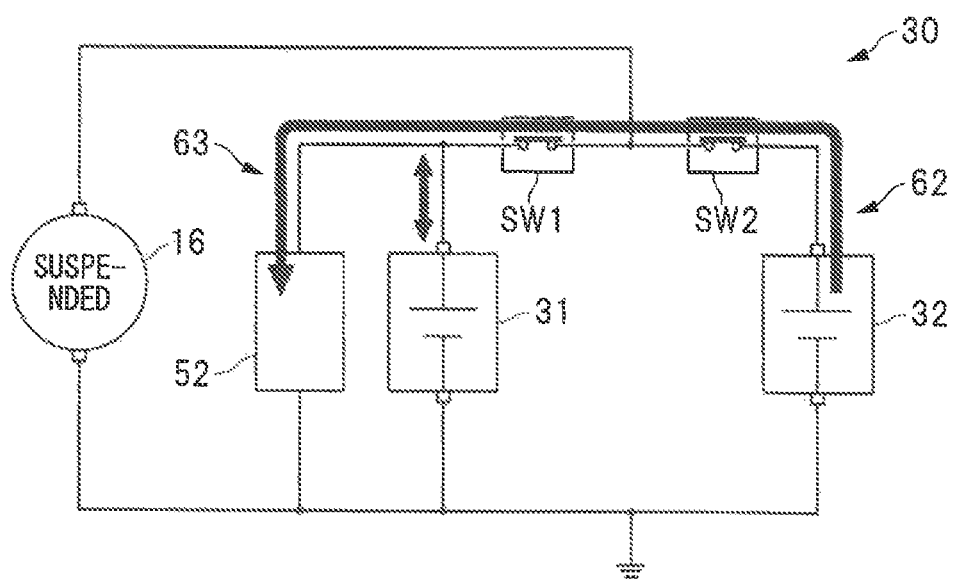
FIG. 4 is a circuit diagram illustrating an example of an electric power supply situation when the starter generator is controlled into a power generation suspended state.

A description is given of a charge-discharge control of the lithium-ion battery 32 by means of the starter generator 16. FIG. 3 illustrates an example of an electric power supply situation when the starter generator 16 is controlled into the electric power generation state. FIG. 4 illustrates an example of an electric power supply situation when the starter generator 16 is controlled into the power generation suspended state. The electric power generation state of the starter generator 16 may include a combustion power generation state in which the starter generator 16 is driven and revolved by means of power derived from the engine 12 and a regenerative power generation state in which the starter generator 16 is driven and revolved by means of kinetic energy generated upon deceleration of the vehicle 11.

Referring to FIG. 3, the starter generator 16 may be controlled into the combustion power generation state when, for example, an amount of charge of the lithium-ion battery 32 is few. For example, in a case where the state of charge SOC of the lithium-ion battery 32 falls below a predetermined lower limit, the starter generator 16 may be controlled into the combustion power generation state, in order to charge the lithium-ion battery 32 for enhancement of the state of charge SOC. When the starter generator 16 is controlled into the combustion power generation state, the electric power generation voltage of the starter generator 16 may be raised above the terminal voltage of the lithium-ion battery 32. This causes the starter generator 16 to supply generated electric power to components such as the lithium-ion battery 32, the electrical load group 52, and the lead battery 31, as indicated by black arrows in FIG. 3.

Referring to FIG. 4, the starter generator 16 may be controlled into the power generation suspended state when, for example, the amount of charge of the lithium-ion battery 32 is sufficient. For example, in a case where the state of charge SOC of the lithium-ion battery 32 exceeds a predetermined upper limit, the starter generator 16 may be controlled into the power generation suspended state, in order to facilitate the discharge of the lithium-ion battery 32 for reduction in an engine load. When the starter generator 16 is controlled into the power generation suspended state, the electric power generation voltage of the starter generator 16 may be lowered below the terminal voltage of the lithium-ion battery 32. This causes electric power to be supplied to the electrical load group 52 from the lithium-ion battery 32, as indicated by a black arrow in FIG. 4. Therefore, it becomes possible to suppress the electric power generation of the starter generator 16, thus allowing for reduction in the engine load.

As described above, the starter generator 16 may be controlled into the state such as the combustion power generation state and the power generation suspended state on the basis of the state of charge SOC. In order to enhance a fuel consumption performance of the vehicle 11, the starter generator 16 may be controlled into the regenerative power generation state upon the deceleration of the vehicle 11. This makes it possible to convert the kinetic energy of the vehicle 11 into electric energy and collect the converted electric energy, thus making it possible to enhance an energy efficiency of the vehicle 11. Whether to execute the power generation by means of the regeneration performed by the starter generator 16 may be determined on the basis of a factor such as a state of operation of an accelerator pedal and a state of operation of a brake pedal. For example, when the accelerator pedal that has been pressed down is released upon the traveling of the vehicle 11, or when the brake pedal is pressed down upon the traveling of the vehicle 11, the electric power generation voltage of the starter generator 16 may be raised above the terminal voltage of the lithium-ion battery 32 and the starter generator 16 may be controlled into the regenerative power generation state as illustrated in FIG. 3. Note that, when the starter generator 16 is controlled into the combustion power generation state, the regenerative power generation state, or the power generation suspended state, the switch SW1 and the switch SW2 may be held in the electrically-conductive state as illustrated in FIGS. 3 and 4.

[Switch Opening-Closing Control]

Figure 5:
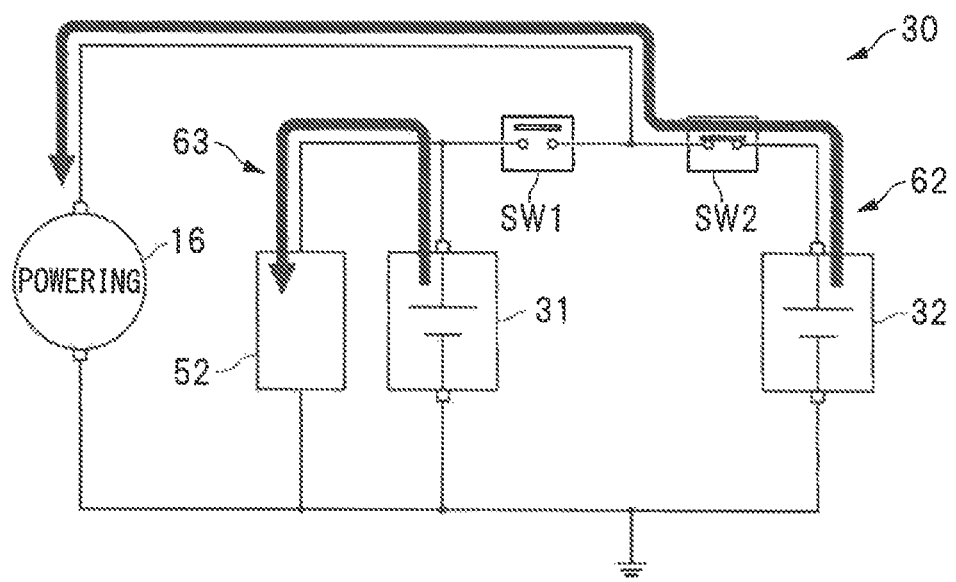
FIG. 5 is a circuit diagram illustrating an example of an electric power supply situation when the starter generator is controlled into a powering state.
Figure 6:
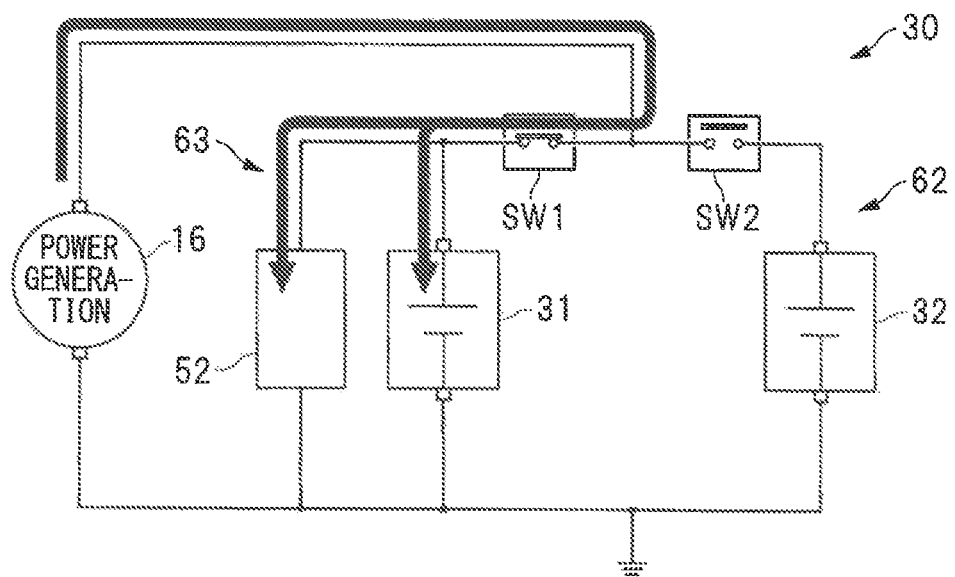
FIG. 6 is a circuit diagram illustrating an example of an electric power supply situation upon performing auxiliary charging of a lead battery by the starter generator.

A description is given of a switch opening-closing control that controls each of the switches SW1 and SW2 into any of the electrically-conductive state and the cutoff state. FIG. 5 illustrates an example of an electric power supply situation when the starter generator 16 is controlled into the powering state. FIG. 6 illustrates an example of an electric power supply situation upon performing the auxiliary charging of the lead battery 31 by means of the starter generator 16.

Referring to FIG. 5, the starter generator 16 may be controlled into the powering state when restarting the engine 12 upon the idling stop control, or when assisting the engine 12 upon the start and the acceleration. Further, when the starter generator 16 is controlled into the powering state, the switch SW1 may be switched from the electrically-conductive state to the cutoff state and the switch SW2 may be held in the electrically-conductive state. Switching the switch SW1 to the cutoff state in this manner causes a power supply system 62, including the lithium-ion battery 32 and the starter generator 16, and a power supply system 63, including the lead battery 31 and the electrical load group 52, to be isolated from each other. Thus, as indicated by black arrows in FIG. 5, it is possible to supply the electric power to the electrical load group 52 from the lead battery 31 while preventing the supply of power from the lead battery 31 to the starter generator 16, even in a situation where power consumption of the starter generator 16 increases. This makes it possible to prevent instantaneous voltage drop for the electrical load group 52, and thereby to allow the electrical load group 52 to operate properly.

Referring to FIG. 6, the starter generator 16 may be controlled into the combustion power generation state upon performing the auxiliary charging of the lead battery 31. For example, a timing at which the auxiliary charging is performed on the lead battery 31 may be a timing after the initial starting of the engine 12 by means of the starter generator 16. In other words, when the engine 12 is to be started by means of the starter generator 16 in response to an occupant's operation of an unillustrated starter switch, the starter generator 16 is driven in a situation where both the switch SW1 and the switch SW2 are in the cutoff state. In such a situation, the starter generator 16 is driven by means of the electric power supplied from the lead battery 31, leading to a decrease in the state of charge SOC of the lead battery 31 accordingly after the initial starting of the engine 12. To recover the thus-decreased state of charge SOC of the lead battery 31, the auxiliary charging of the lead battery 31 by means of the starter generator 16 may be executed after the initial starting of the engine 12. Upon executing the auxiliary charging of the lead battery 31 by means of the starter generator 16, the switch SW1 may be switched from the cutoff state to the electrically-conductive state, and the switch SW2 may be held in the cutoff state. Controlling the switch SW1 and the switch SW2 in this manner allows the lithium-ion battery 32 to be isolated from the starter generator 16, making it possible to actively supply the electric power derived from the electric power generation of the starter generator 16 to the lead battery 31. This in turn makes it possible to recover the state of charge SOC of the lead battery 31 promptly.

[Controller Power Supply]

Figure 7:
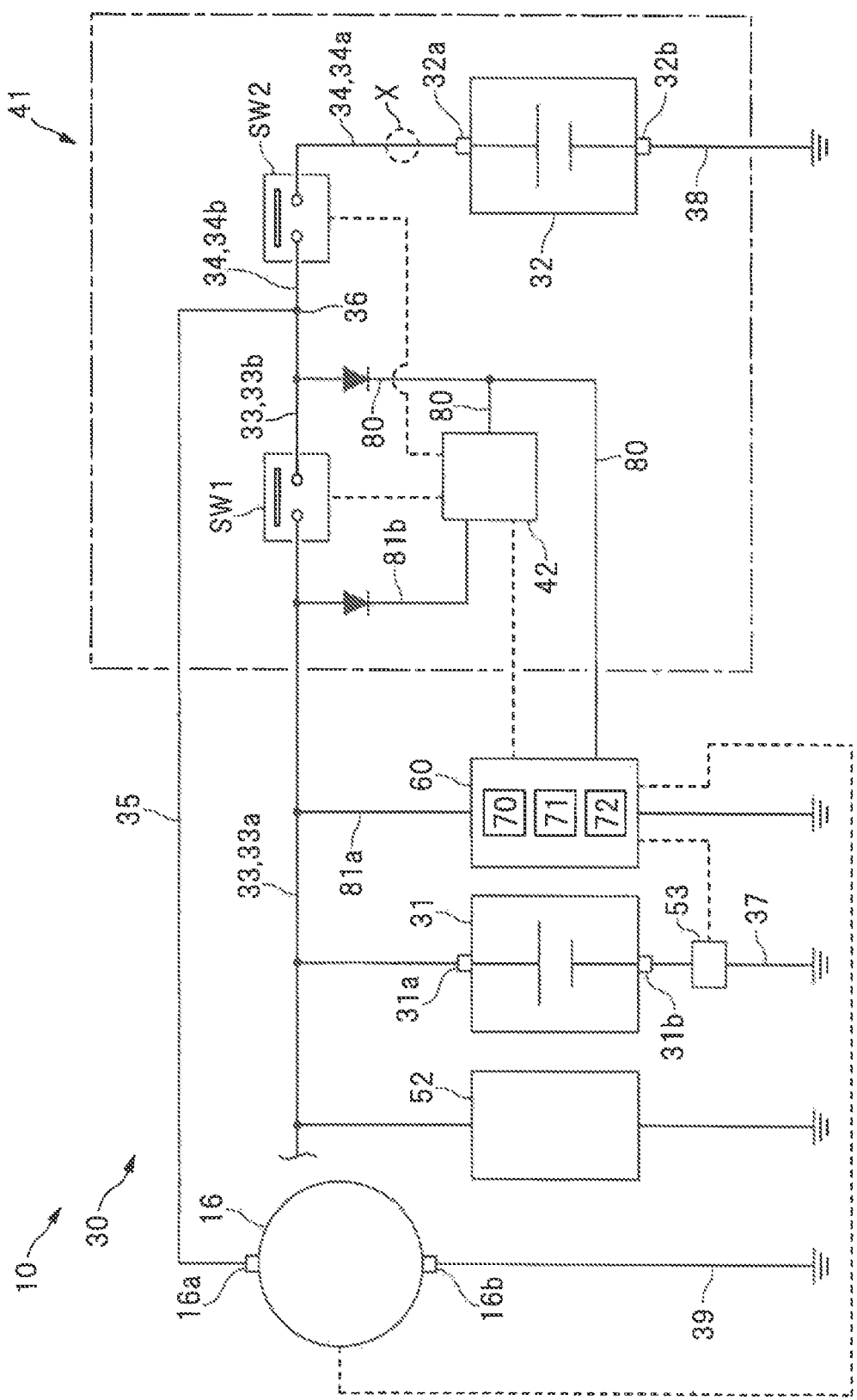
FIG. 7 is a circuit diagram illustrating an example of coupling of power supply lines to a main controller and to a battery controller.

A description is given next of a supply path of power supply for the main controller 60 and the battery controller 42. FIG. 7 illustrates an example of coupling of power supply lines 80, 81a, and 81b to the main controller 60 and the battery controller 42.

Referring to FIG. 7, the power supply line 80 may be coupled to the main controller 60 and the battery controller 42. In one implementation, the power supply line 80 may serve as a "first power supply line". The power supply line 80 may be coupled to the conducting line 33b that configures the positive line 33. It is to be noted that, in an alternative implementation, a conducting path to which the power supply line 80 is coupled may be the positive line 35, or may be the conducting line 34b that configures the positive line 34. Hence, the conducting line 33b, the conducting line 34b, and the positive line 35 to which the power supply line 80 is coupled may be examples of a conducting path that is coupled to the positive terminal 16a of the starter generator 16, to the switch SW1, and to the switch SW2. In other words, the conducting path to which the power supply line 80 is coupled may be any conducting path that is at the same potential as the positive terminal 16a of the starter generator 16 where both the switch SW1 and the switch SW2 are in the cutoff state. It is to be noted that the power supply line 80 may be coupled to the node 36, in an alternative implementation.

Further, the power supply line 81a and the power supply line 81b may respectively be coupled to the main controller 60 and the battery controller 42. In one implementation, the power supply line 81a and the power supply line 81b may serve as a "second power supply line". The power supply line 81a and the power supply line 81b may be coupled to the conducting line 33a that configures the positive line 33. Hence, the conducting line 33a to which the power supply line 81a and the power supply line 81b are coupled may be an example of a conducting path that is coupled to the positive terminal 31a of the lead battery 31 and to the switch SW1. In other words, the conducting path to which the power supply line 81a and the power supply line 81b are coupled may be any conducting path that is at the same potential as the positive terminal 31a of the lead battery 31 where the switch SW1 is in the cutoff state. Accordingly, in an example implementation, the main controller 60 and the battery controller 42 may receive the supply of electric power from the power supply line 80 that is coupled to one side of the switch SW1, and each may receive the supply of electric power from corresponding one of the power supply lines 81a and 81b that are coupled to the other side of the switch SW1.

[Fail-Safe Control]

Figure 8:
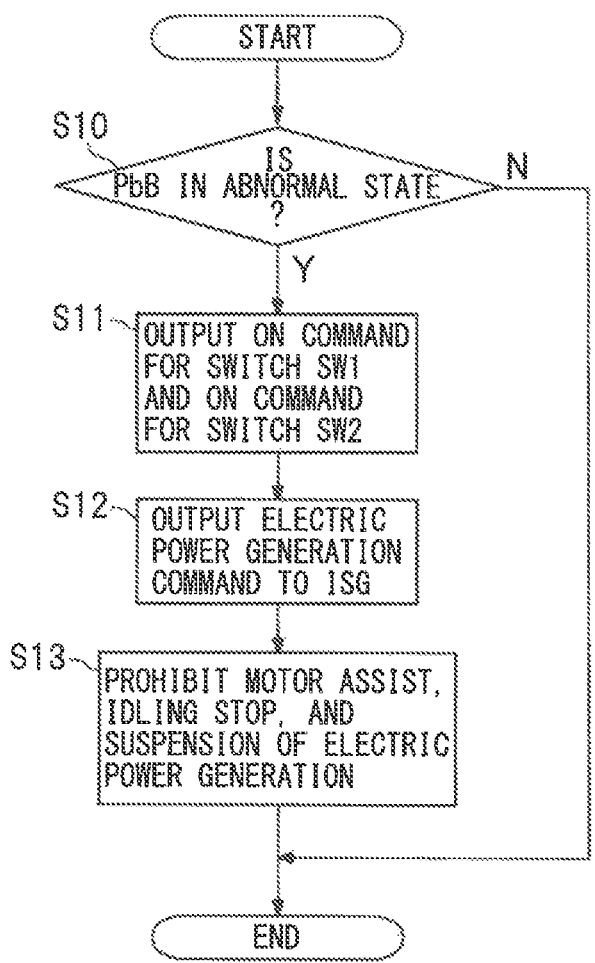
FIG. 8 is a flowchart illustrating an example of a procedure for execution of a fail-safe control.
Figure 9:
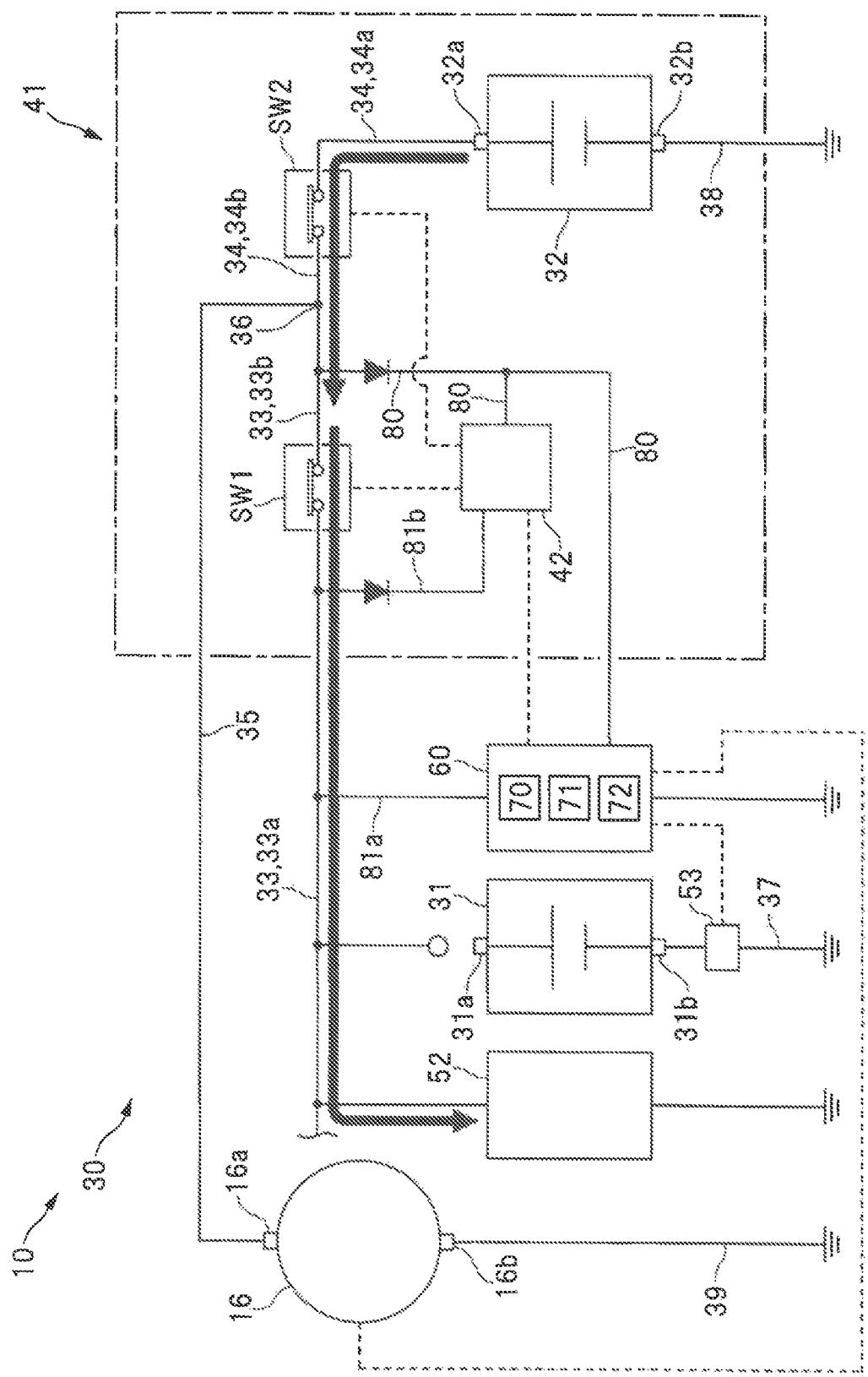
FIG. 9 is a circuit diagram illustrating an example of an electric power supply situation upon the fail-safe control.
Figure 10:
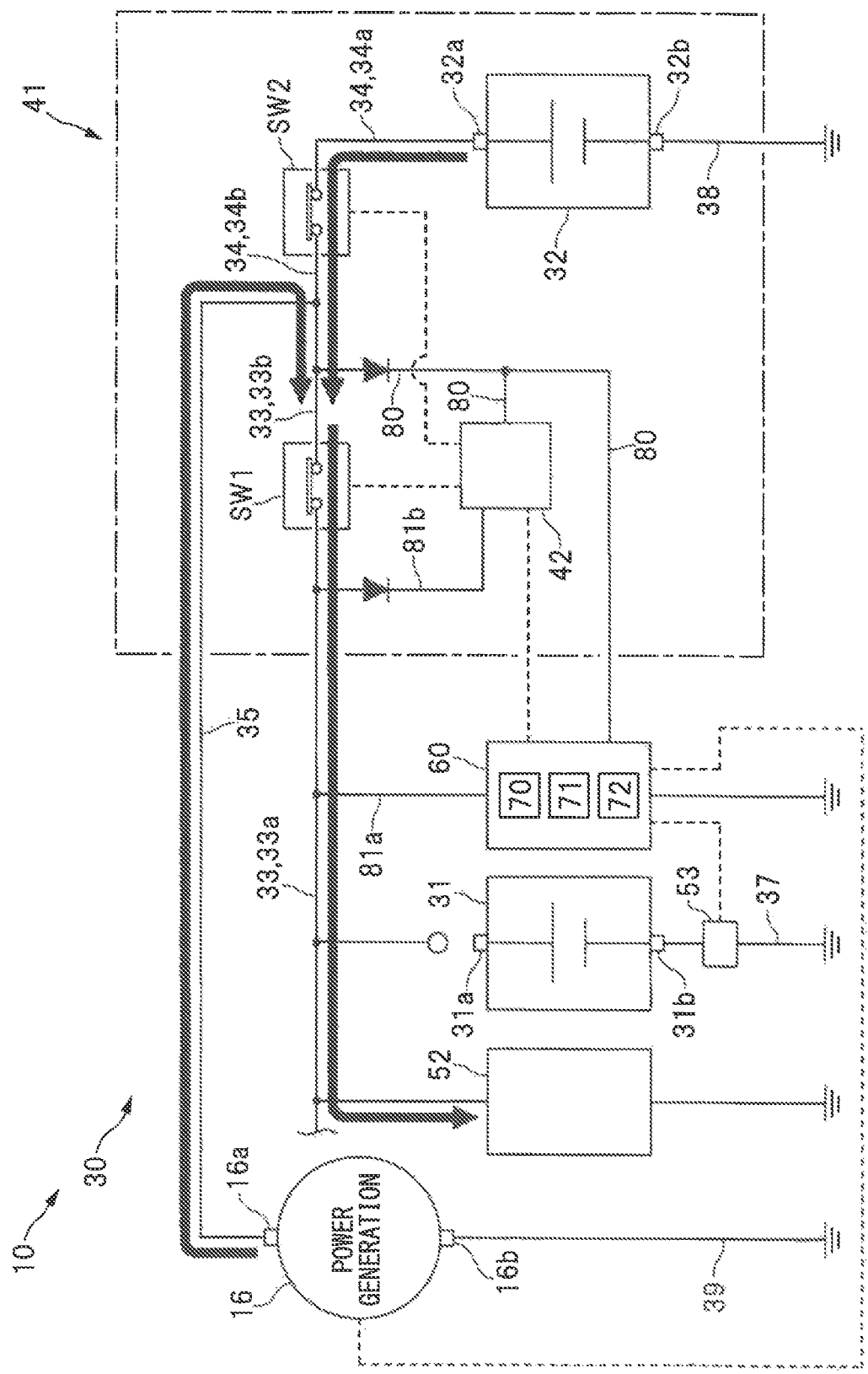
FIG. 10 is a circuit diagram illustrating an example of the electric power supply situation upon the fail-safe control.

A description is given next of a fail-safe control where an abnormality occurs in the lead battery 31 according to an example implementation. The fail-safe control may be performed by the main controller 60 at every predetermined cycle. FIG. 8 is a flowchart illustrating an example of a procedure for execution of the fail-safe control, in which "ISG" and "PbB" respectively denote the starter generator 16 and the lead battery 31. FIGS. 9 and 10 each illustrate an example of an electric power supply situation upon the fail-safe control, where a removal of the positive line 33 from the positive terminal 31a of the lead battery 31 occurs as one example of the abnormal state of the lead battery 31.

Referring to FIG. 8, in step S10, the battery determiner 72 of the main controller 60 may determine whether the lead battery 31 is in the abnormal state. For example, the battery determiner 72 of the main controller 60 may determine that the lead battery 31 is in the normal state in which the lead battery 31 is able to discharge normally, when the voltage, the current, and/or any other factor of the lead battery 31 falls within a predetermined normal range, and may determine that the lead battery 31 is in the abnormal state in which the lead battery 31 is not able to discharge normally, when the voltage, the current, and/or any other factor of the lead battery 31 falls outside the predetermined normal range.

The lead battery 31 may be determined by the battery determiner 72 as being in the abnormal state in which the lead battery 31 is not able to discharge normally, in example cases where the positive line 33 is removed from the positive terminal 31a of the lead battery 31, where the negative line 37 is removed from the negative terminal 31b of the lead battery 31, and/or where disconnection occurs in the positive line 33, in the negative line 37, or in any other line. In other words, the lead battery 31 may be determined as being in the abnormal state when the lead battery 31 is electrically disconnected from the power supply circuit 30. It is to be noted that the abnormal state of the lead battery 31 may encompass any state as long as the lead battery 31 is not able to discharge normally. For example, the lead battery 31 may be determined as being in the abnormal state in example cases where the state of charge SOC, the terminal voltage, and/or any other factor of the lead battery 31 falls below a predetermined lower limit, where the internal resistance, a temperature, and/or any other factor of the lead battery 31 exceeds a predetermined upper limit, or where the lead battery 31 is affected by short circuit.

When the lead battery 31 is determined as being in the abnormal state in step S10 (S10: Y), the flow may proceed to step S11 in which the main controller 60 may output, to the battery controller 42, an ON command directed to turning on of the switch SW1. This causes the switch SW1 to be controlled into the electrically-conductive state by the battery controller 42. In addition, in step S11, an ON command for turning on of the switch SW2 may be outputted from the main controller 60 to the battery controller 42. This causes the switch SW2 to be controlled into the electrically-conductive state by the battery controller 42. Referring to FIG. 9, when the lead battery 31 is determined as being in the abnormal state, i.e., when the electric power is not supplied to the electrical load group 52 from the lead battery 31, both of the switch SW1 and the switch SW2 may be controlled into the electrically-conductive state as described above to thereby couple the lithium-ion battery 32 to the electrical load group 52. Thus, as indicated by black arrows in FIG. 9, it is possible to supply the electric power to the electrical load group 52 from the lithium-ion battery 32 by controlling both of the switch SW1 and the switch SW2 into the electrically-conductive state. Hence, it is possible to allow the electrical load group 52 to operate normally and keep minimum traveling performance even in a case where the abnormality occurs in the lead battery 31.

Note that the flow may be concluded (END) when the lead battery 31 is determined in step S10 as not being in the abnormal state (S10: N).

Referring back to FIG. 8, the flow may thereafter proceed to step S12 in which the main controller 60 may output an electric power generation command to the ISG controller 23. This causes the starter generator 16 to be controlled into the electric power generation state by the ISG controller 23. Thus, as indicated by black arrows in FIG. 10, it is possible to supply the electric power to the electrical load group 52 not only from the lithium-ion battery 32 but also from the starter generator 16. Hence, controlling the starter generator 16 into the electric power generation state in this way makes it possible to allow the electrical load group 52 to operate continuously and keep the minimum traveling performance without being restricted by the state of charge SOC of the lithium-ion battery 32. Accordingly, it is possible to increase reliability of the vehicle power supply apparatus 10.

Referring back to FIG. 8, the flow may thereafter proceed to step S13 in which performing a motor assist control and the idling stop control, each involving the powering state of the starter generator 16, and placing the starter generator 16 into the power generation suspended state are prohibited. Thus, it is possible to control the starter generator 16 into the electric power generation state on a continuous basis. Hence, it is possible to allow the electrical load group 52 to operate continuously and keep the minimum traveling performance.

[Switch Control in Fail-Safe Control]

Figure 11:
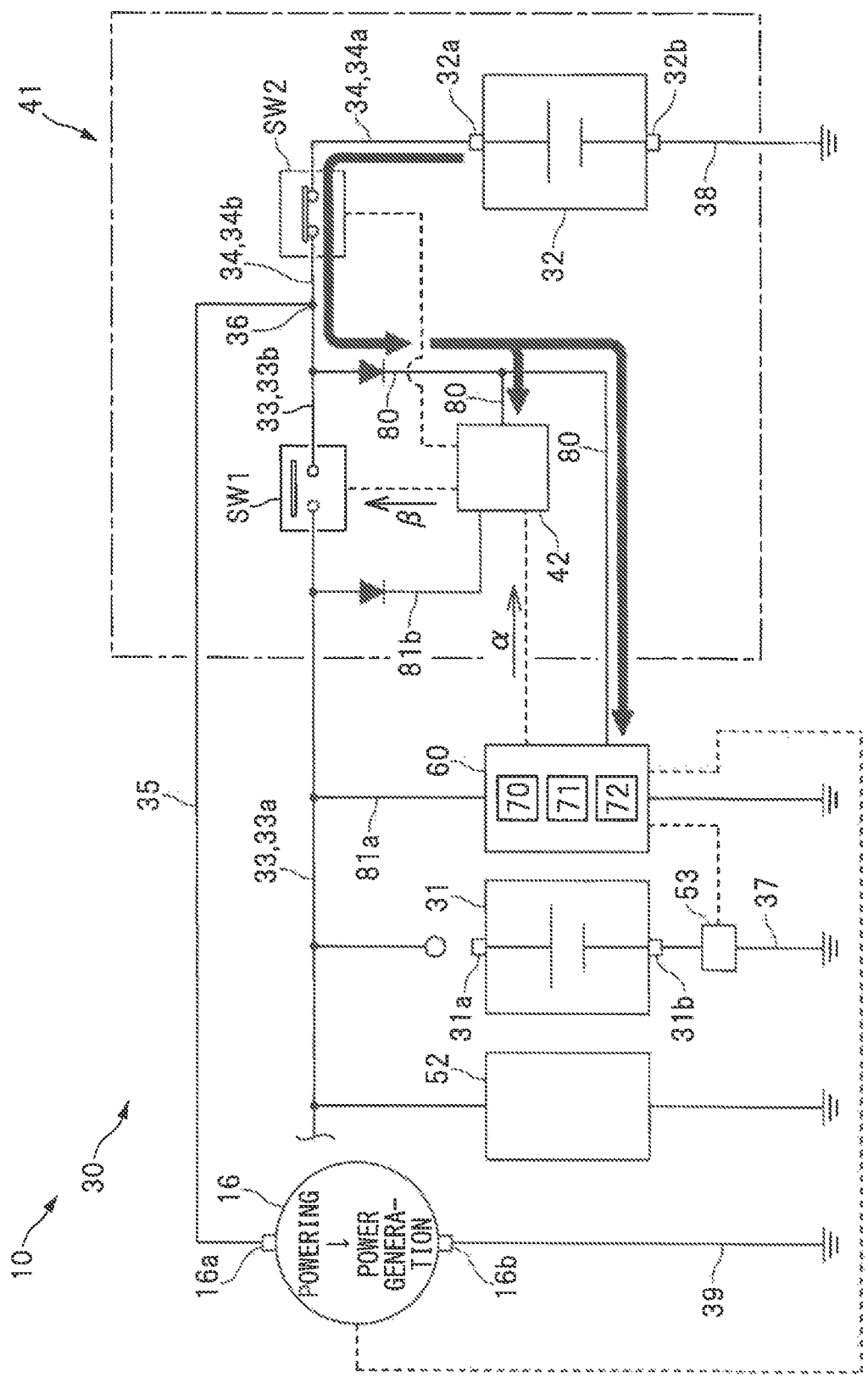
FIG. 11 is a diagram describing an example of a course of switching a switch SW1 to an electrically-conductive state upon the fail-safe control.
Figure 12:
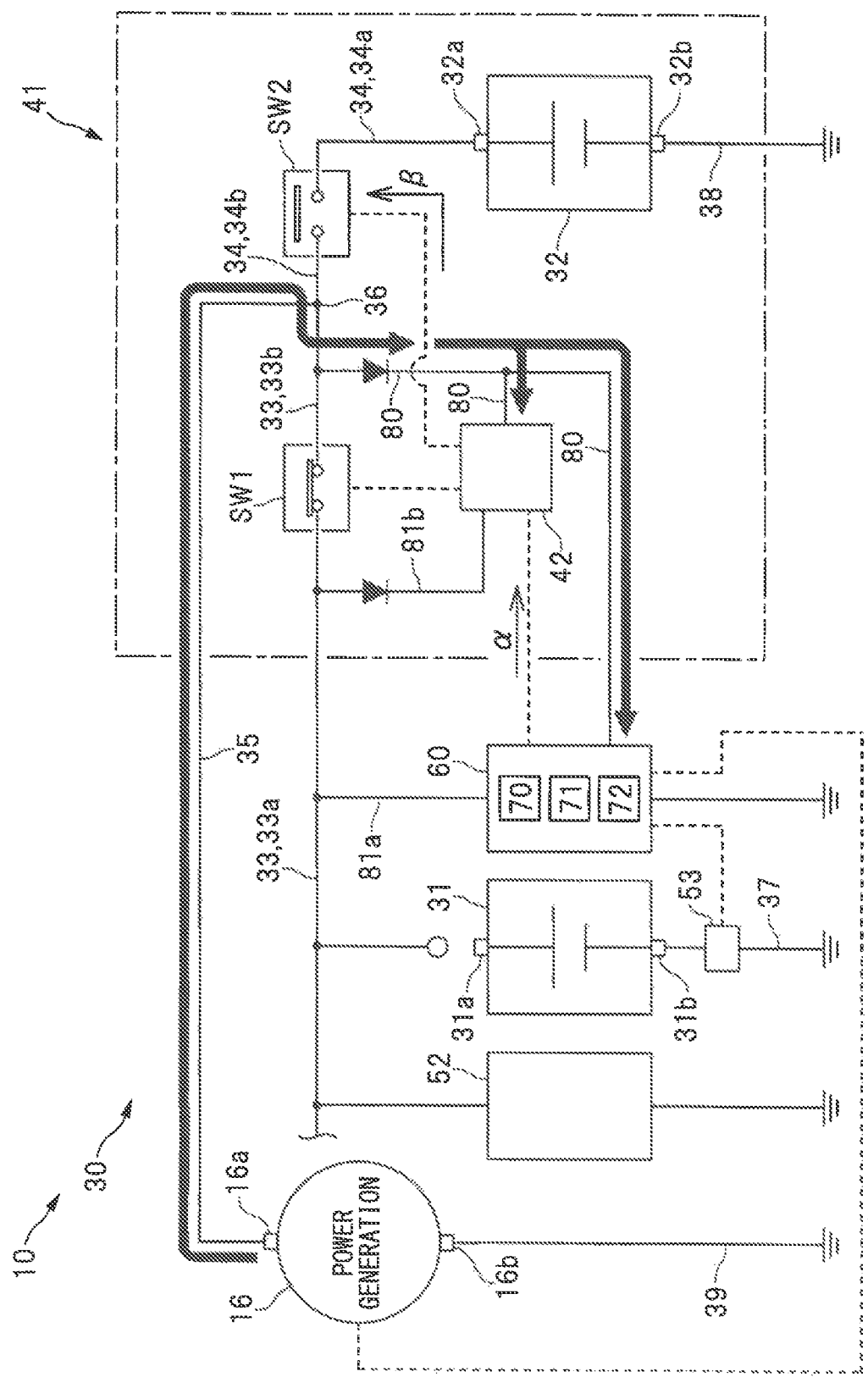
FIG. 12 is a diagram describing an example of a course of switching a switch SW2 to an electrically-conductive state upon the fail-safe control.

A description is given next of a course of controlling the switch SW1 and the switch SW2 upon the fail-safe control. FIG. 11 describes an example of a course of switching the switch SW1 to the electrically-conductive state upon the fail-safe control. FIG. 12 describes an example of a course of switching the switch SW2 to the electrically-conductive state upon the fail-safe control.

As described previously, the switch SW1 and the switch SW2 are both controlled into the electrically-conductive state upon the fail-safe control. It is to be noted, however, that a normal operation of the main controller 60, the battery controller 42, or both may possibly be disturbed when the lead battery 31 is in the abnormal state. To address this, in an example implementation, not only the power supply line 81a and the power supply line 81b but also the power supply line 80 may be coupled to the main controller and the battery controller 42.

For example, in a case where an abnormality occurs in the lead battery 31 under circumstances where the starter generator 16 is controlled into the powering state as illustrated in FIG. 5, i.e., under circumstances where the switch SW1 is controlled into the cutoff state as illustrated in FIG. 5, coupling the power supply line 80 allows the electric power to be supplied, through the power supply line 80, to the main controller 60 and the battery controller 42 from the lithium-ion battery 32 as indicated by black arrows in FIG. 11. This makes it possible to operate the main controller 60 and the battery controller 42 normally. Thus, the main controller 60 may successfully output, to the battery controller 42, the ON command directed to turning on of the switch SW1 as denoted by an arrow α, and the battery controller 42 may successfully supply a drive current to the switch SW1 accordingly as denoted by an arrow β. Hence, it is possible to control the switch SW1 into the electrically-conductive state from the cutoff state even in a case where the abnormality occurs in the lead battery 31. It is to be noted that the main controller 60 may also output the power-generation command, whereby the starter generator 16 may be controlled into the electric power generation state from the powering state.

Further, for example, in a case where an abnormality occurs in the lead battery 31 under circumstances where the auxiliary charging of the lead battery 31 is performed by the starter generator 16 as illustrated in FIG. 6, i.e., under circumstances where the switch SW2 is controlled into the cutoff state as illustrated in FIG. 6, coupling the power supply line 80 allows the electric power to be supplied, through the power supply line 80, to the main controller 60 and the battery controller 42 from the starter generator 16 that is in the electric power generation state as indicated by black arrows in FIG. 12. This makes it possible to operate the main controller 60 and the battery controller 42 normally. Thus, the main controller 60 may successfully output, to the battery controller 42, the ON command directed to turning on of the switch SW2 as denoted by an arrow α, and the battery controller 42 may successfully supply a drive current to the switch SW2 accordingly as denoted by an arrow β. Hence, it is possible to control the switch SW2 into the electrically-conductive state from the cutoff state even in a case where the abnormality occurs in the lead battery 31. It is to be noted that the starter generator 16 may be controlled into the electric power generation state continuously.

In the foregoing example implementation, the power supply line 80 is coupled to the main controller 60 and the battery controller 42. Thus, it is possible to control both of the switch SW1 and the switch SW2 into the electrically-conductive state properly even when the abnormality occurs in the lead battery 31. Hence, it is possible to execute the fail-safe control properly and increase the reliability of the vehicle power supply apparatus 10.

It is to be noted that the power supply line 81*a* and the power supply line 81*b*, coupled respectively to the main controller 60 and the battery controller 42, are each a power supply line that supplies the electric power to corresponding one of the main controller 60 and the battery controller 42 upon a regular control. In this regard, the switch SW1 and the switch SW2 are both controlled into the cutoff state when a control system of the vehicle 11 is stopped by turning off the starter switch or by any other factor, meaning that the switch SW1 and the switch SW2 are both held in the cutoff state upon start-up of the control system of the vehicle 11. Even in such circumstances, however, the electric power is supplied, through the power supply line 81*a* and the power supply line 81*b*, to the main controller 60 and the battery controller 42 from the lead battery 31, making it possible to perform the start-up of the control system of the vehicle 11 properly.

It is to be also noted that the power supply line 80, used upon the fail-safe control, is coupled to the conducting line 33*b* that configures the positive line 33, in one implementation illustrated in FIG. 7. In an alternative implementation, the power supply line 80 may be coupled to the conducting line 34*a* that configures the positive line 34 as denoted by X, in order to supply the electric power from the lithium-ion battery 32 to the main controller 60 and/or to any other device through the power supply line 80. Coupling the power supply line 80 to the conducting line 34*a*, however, results in constant coupling of the main controller 60 and the battery controller 42 to the lithium-ion battery 32, possibly leading to excessive discharging of the lithium-ion battery 32 due to a dark current. Accordingly, in some implementations of the technology, the power supply line 80 may be coupled to any conducting path disconnectable from the lithium-ion battery 32, such as the conducting line 33*b*, the conducting line 34*b*, or the positive line 35.

Although some implementations of the technology have been described in the foregoing with reference to the accompanying drawings, the technology is by no means limited to the implementations described above. Various changes and modifications may be made to any implementation without departing from the scope of the technology. For example, in an example implementation described above, the lead battery 31 serves as the first electricity storage and the lithium-ion battery 32 serves as the second electricity storage; however, this is not limitative. In an alternative implementation, any other type of battery or capacitor may be adopted. Further, in an example implementation described above, the first electricity storage and the second electricity storage are different from each other in kind; however, this is not limitative. In an alternative implementation, the first electricity storage and the second electricity storage may be the same as each other in kind. In an example implementation described above, the starter generator 16 as the integrated starter generator (ISG) serves as a non-limiting example of a "motor generator"; however, this is not limitative. In an alternative implementation, a motor generator as a drive source of a hybrid vehicle may be adopted.

In an example implementation described above, the main controller 60 serves as the switch controller, the electricity storage determiner, and the motor controller; however, this is not limitative. In an alternative implementation, any other controller may serve as one or more of the switch controller, the electricity storage determiner, and the motor controller. In a yet alternative implementation, a plurality of controllers may serve as one or more of the switch controller, the electricity storage determiner, and the motor controller.

In an example implementation described above, a combination of the main controller 60 and the battery controller 42 configures the switch controller; however, this is not limitative. In an alternative implementation, the switch controller may be configured by a single controller.

In an example implementation described above, a combination of the main controller 60 and the ISG controller 23 configures the motor controller; however, this is not limitative. In an alternative implementation, the motor controller may be configured by a single controller.

Further, in an example implementation described above, the switch SW1 and the switch SW2 are incorporated in the battery module 41; however, this is not limitative. In an alternative implementation, the switch SW1, the switch SW2, or both may be provided outside the battery module 41. In an example implementation described above, the switch SW2 is provided on the positive line 34 of the lithium-ion battery 32; however, this is not limitative. In an alternative implementation, as indicated by an alternate long and short dashed line in FIG. 2, the switch SW2 may be provided on the negative line 38 of the lithium-ion battery 32.

Incidentally, various proposals have been made on a vehicle power supply apparatus to be mounted on a vehicle. For example, JP-A No. 2013-256267 proposes a power supply apparatus that includes a plurality of batteries. The power supply apparatus described in JP-A No. 2013-256267 is provided with a power supply system that includes a main battery and electrical loads coupled to the main battery, a power system that includes a sub-battery and electrical loads coupled to the sub-battery, and a switch, such as a relay, that is disposed between the two power supply systems. The power supply systems are isolated from each other by cutting off the switch.

Further, in the power supply apparatus described in JP-A No. 2013-256267, the electrical loads coupled to the main battery include an electric motor, whereas the electrical loads coupled to the sub-battery include devices, such as meters, in which an instantaneous voltage drop is not tolerable. Upon execution of a torque assist control that assists an engine by driving the electric motor, the switch is cut off to isolate the power supply system having the main battery and the power supply system having the sub-battery from each other. Such a configuration prevents the instantaneous voltage drop from occurring in the meters, etc., even under circumstances where power consumption of the electric motor increases as a result of the execution of the torque assist control.

On the other hand, in a situation where a state of charge or a temperature of the sub-battery is not detectable, the power supply apparatus described in JP-A No. 2013-256267 prohibits the execution of the torque assist control during which the power supply systems are isolated from each other as a result of the cutting off of the switch. The execution of the torque assist control is prohibited in consideration of a fact that a normal operation of the sub-battery is not ensured in the situation where the state of charge or the temperature of the sub-battery is not detectable. The power supply apparatus described in JP-A No. 2013-256267, however, involves difficulties in normally operating the electrical loads coupled to the sub-battery that is isolated from the main battery, under circumstances where an abnormality occurs in the sub-battery after the switch is cut off as a result of the execution of the torque assist control. Such a situation that involves difficulties in operating any of the electrical loads normally becomes a factor that decreases reliability of a vehicle power supply apparatus.

In contrast, the first switch and the second switch are controlled into the electrically-conductive state when the first electricity storage is determined as being in the abnormal state. Hence, it is possible to couple the second electricity storage to the first electricity storage, and to increase reliability of the vehicle power supply apparatus.

The main controller 60 and the battery controller 42 illustrated in FIGS. 1 and 7 are each implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the main controller 60 and the battery controller 42. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the main controller 60 and the battery controller 42 illustrated in FIGS. 1 and 7.

Although some implementations of the technology have been described in the foregoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle power supply apparatus, comprising:
 a motor generator coupled to an engine;
 a first electricity storage able to be coupled to the motor generator;
 a second electricity storage able to be coupled to the motor generator in parallel to the first electricity storage;
 a first switch configured to switch from an electric conduction between the motor generator and the first electricity storage to cutoff between the motor generator and the first electricity storage, and to switch from the cutoff between the motor generator and the first electricity storage to the electric conduction between the motor generator and the first electricity storage;
 a second switch configured to switch from an electric conduction between the motor generator and the second electricity storage to cutoff between the motor generator and the second electricity storage, and to switch from the cutoff between the motor generator and the second electricity storage to the electric conduction between the motor generator and the second electricity storage;
 a switch controller configured to control the first switch and the second switch;
 an electricity storage determiner configured to determine an abnormality of the first electricity storage;
 a first power supply line coupled to the switch controller and to a conducting path coupled to the first switch, the second switch, and a terminal of the motor generator; and
 a second power supply line coupled to the switch controller and to another conducting path coupled to the first switch and a terminal of the first electricity storage,
 wherein, based on the first power supply line and the second power supply line, the switch controller is configured to control each of the first switch and the second switch into an electrically-conductive state when the first electricity storage is determined by the electricity storage determiner as being in an abnormal state.

2. The vehicle power supply apparatus according to claim 1, further comprising a motor controller configured to control the motor generator, and control the motor generator into an electric power generation state when the first electricity storage is determined by the electricity storage determiner as being in the abnormal state.

3. The vehicle power supply apparatus according to claim 2, wherein the terminal of the motor generator comprises a positive terminal of the motor generator.

4. The vehicle power supply apparatus according to claim 3, wherein the terminal of the first electricity storage a positive terminal of the first electricity storage.

5. The vehicle power supply apparatus according to claim 4, further comprising a power supply circuit,
 wherein the electricity storage determiner determines that the first electricity storage is in the abnormal state when the first electricity storage is disconnected from the power supply circuit.

6. The vehicle power supply apparatus according to claim 3, further comprising a power supply circuit,
wherein the electricity storage determiner determines that the first electricity storage is in the abnormal state when the first electricity storage is disconnected from the power supply circuit.

7. The vehicle power supply apparatus according to claim 2, further comprising a power supply circuit,
wherein the electricity storage determiner determines that the first electricity storage is in the abnormal state when the first electricity storage is disconnected from the power supply circuit.

8. The vehicle power supply apparatus according to claim 1, wherein the terminal of the motor generator comprises a positive terminal of the motor generator.

9. The vehicle power supply apparatus according to claim 8, wherein the terminal of the first electricity storage comprises a positive terminal of the first electricity storage.

10. The vehicle power supply apparatus according to claim 9, further comprising a power supply circuit,
wherein the electricity storage determiner determines that the first electricity storage is in the abnormal state when the first electricity storage is disconnected from the power supply circuit.

11. The vehicle power supply apparatus according to claim 8, further comprising a power supply circuit,
wherein the electricity storage determiner determines that the first electricity storage is in the abnormal state when the first electricity storage is disconnected from the power supply circuit.

12. The vehicle power supply apparatus according to claim 1, further comprising a power supply circuit,
wherein the electricity storage determiner determines that the first electricity storage is in the abnormal state when the first electricity storage is disconnected from the power supply circuit.

13. The vehicle power supply apparatus according to claim 1, further comprising:
an electrical load group coupled to said another conducting path that is coupled to the first switch and the terminal of the first electricity storage.

14. The vehicle power supply apparatus according to claim 1, wherein the second electricity storage has a terminal voltage that is higher than a terminal voltage of the first electricity storage to actively discharge the second electricity storage.

15. The vehicle power supply apparatus according to claim 14, wherein the second electricity storage comprises a lithium-ion battery, and the first electricity storage comprises a lead battery.

16. A vehicle power supply apparatus, comprising:
a motor generator coupled to an engine;
a first electricity storage able to be coupled to the motor generator;
a second electricity storage able to be coupled to the motor generator in parallel to the first electricity storage;
a first switch configured to switch from an electric conduction between the motor generator and the first electricity storage to cutoff between the motor generator and the first electricity storage, and to switch from the cutoff between the motor generator and the first electricity storage to the electric conduction between the motor generator and the first electricity storage;
a second switch configured to switch from an electric conduction between the motor generator and the second electricity storage to cutoff between the motor generator and the second electricity storage, and to switch from the cutoff between the motor generator and the second electricity storage to the electric conduction between the motor generator and the second electricity storage;
a circuitry including a switch controller;
a first power supply line coupled to the switch controller and a conducting path coupled to the first switch, the second switch and a terminal of the motor generator; and
a second power supply line coupled to the switch controller and to another conducting path coupled to the first switch and a terminal of the first electricity storage,
wherein the circuitry is configured to:
control the first switch and the second switch;
determine an abnormality of the first electricity storage; and
based on the first power supply line and the second power supply line, control each of the first switch and the second switch into an electrically-conductive state when the first electricity storage is determined as being in an abnormal state.

17. The vehicle power supply apparatus according to claim 16, wherein the terminal of the motor generator comprises a positive terminal of the motor generator.

18. The vehicle power supply apparatus according to claim 17, wherein the terminal of the first electricity storage comprises a positive terminal of the first electricity storage.

19. The vehicle power supply apparatus according to claim 16, further comprising:
a motor controller configured to control the motor generator and to control the motor generator into an electric power generation state when the circuitry determines that the first electricity storage is in the abnormal state.

20. The vehicle power supply apparatus according to claim 16, further comprising:
an electrical load group coupled to said another conducting path that is coupled to the first switch and the terminal of the first electricity storage.

* * * * *